United States Patent
Ryan

(12) United States Patent (Ryan)

(10) Patent No.: US 7,158,329 B1
(45) Date of Patent: Jan. 2, 2007

(54) DISK DRIVE EMPLOYING ACTIVE BRAKING USING INDUCTIVE SENSE

(75) Inventor: Robert P. Ryan, Mission Viejo, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 11/134,917

(22) Filed: May 23, 2005

(51) Int. Cl.
  G11B 15/46 (2006.01)
  G11B 15/48 (2006.01)
  H02P 1/00 (2006.01)

(52) U.S. Cl. .......... 360/73.03; 360/74.1; 318/254; 318/273

(58) Field of Classification Search .......... None
See application file for complete search history.

(56) References Cited

U.S. PATENT DOCUMENTS

| | | | |
|---|---|---|---|
| 5,122,998 A * | 6/1992 | Mizuno et al. | 369/13.2 |
| 5,530,326 A | 6/1996 | Galvin et al. | |
| 5,569,990 A | 10/1996 | Dunfield | |
| 6,100,656 A | 8/2000 | El-Sadi et al. | |
| 6,104,153 A | 8/2000 | Codilian et al. | |
| 6,198,590 B1 | 3/2001 | Codilian et al. | |
| 6,369,541 B1 | 4/2002 | Albert | |
| 6,549,359 B1 | 4/2003 | Bennett et al. | |
| 6,549,361 B1 | 4/2003 | Bennett et al. | |
| 6,574,062 B1 | 6/2003 | Bennett et al. | |
| 6,577,465 B1 | 6/2003 | Bennett et al. | |
| 2002/0171380 A1 * | 11/2002 | Heydt et al. | 318/254 |

* cited by examiner

*Primary Examiner*—Andrew L. Sniezek
(74) *Attorney, Agent, or Firm*—Jason T. Evans, Esq.; Howard H. Sheerin, Esq.

(57) ABSTRACT

A disk drive is disclosed comprising a disk, a head actuated over the disk, and a spindle motor for rotating the disk, the spindle motor comprising a plurality of windings. Disk control circuitry executes a spin-down operation of the spindle motor by estimating an angular position of the spindle motor by applying a voltage to at least one of the windings and evaluating a rise time of current flowing through the winding. The windings are commutated in response to the estimated angular position, and a driving current is applied to the windings to brake the spindle motor.

12 Claims, 9 Drawing Sheets

DISK DRIVE EMPLOYING ACTIVE BRAKING USING INDUCTIVE SENSE

BACKGROUND OF THE INVENTION

1. Field of the Invention

The present invention relates to disk drives. More particularly, the present invention relates to a disk drive employing active braking using inductive sense.

2. Description of the Prior Art

FIG. 1 shows a prior art disk drive 2 comprising a disk 4 having a plurality of tracks, a head 6, a voice coil motor 8 for actuating the head 6 radially over the disk 4, and an interface 10 for receiving a primary supply voltage 12 and a secondary supply voltage 14 from a host computer. The disk drive 2 further comprises a multi-phase spindle motor 16 for rotating the disk 4, wherein the multi-phase spindle motor 16 comprises a plurality of windings (e.g., φA, φB, φC) having a first end and a second end, wherein the second ends are connected together at a center tap 18. A spindle driver 20, responsive to the primary supply voltage 12, commutates the windings over commutation intervals. The spindle motor 16 is shown as comprising three windings (φA, φB, φC) corresponding to three phases. However, any suitable number of windings may be employed to implement any suitable multi-phase spindle motor. Further, any suitable commutation sequence may be employed to commutate the windings. For example, the commutation logic 22 may control switches 23 to commutate the windings of the spindle motor 16 in a two-phase, three-phase, or hybrid two-phase/three-phase commutation sequence.

Disk control circuitry 24 communicates with the host computer over interface 11 and executes various operations (e.g., servo control, read/write channel, etc.) to perform read and write commands. The disk control circuitry 24 generates a control signal 26 and a pulse width modulated (PWM) signal 28 applied to the spindle driver 20. The control signal 26 comprises control information (such as a starting state and a commutation clock), and the PWM signal 28 is used to modulate the driving current in the windings. The windings are connected to a back EMF detector 30 which detects threshold crossings (e.g., zero crossings) in the back EMF voltage generated by the windings with respect to the center tap 18. Since the back EMF voltage is distorted when current is flowing, the spindle driver 20 supplies a control signal 32 to the back EMF detector 30 identifying the "open" winding generating a valid back EMF signal. At each back EMF threshold crossing the back EMF detector 30 toggles a signal to generate a square wave signal 34. The frequency of the back EMF threshold crossings and thus the frequency of the square wave signal 34 represent the speed of the spindle motor 16. The disk control circuitry 24 evaluates the square wave signal 34 and adjusts the PWM signal 28 in order to control the speed of the spindle motor 16.

The disk drive 2 of FIG. 1 further comprises a voice coil motor (VCM) driver 36 responsive to the primary and secondary supply voltages 12 and 14. The VCM driver 36 applies the primary supply voltage 12 to the voice coil motor 8 through driver 37 either in a linear power amplifier mode or in a modulated sequence (e.g., PWM) to control the speed of the voice coil motor 8 while actuating the head 6 radially over the disk 4. The secondary supply voltage 14 powers circuitry within the VCM driver 36 as well as other circuitry within the disk drive 2, such as the spindle driver 20 and disk control circuitry 24. In one embodiment, the primary supply voltage 12 comprises twelve volts and the secondary supply voltage 14 comprises five volts. In an alternative embodiment, the disk drive 2 receives a single supply voltage (e.g., five volts) for driving the VCM 8 and spindle motor 16 and for powering circuitry in the disk drive 2.

Under certain circumstances, the disk drive 2 parks the head 6 and spins down the disk 4, for example in portable applications in order to conserve battery life while the disk drive is idle. If the head 6 is parked on the disk 4 in a landing zone (e.g., at an inner diameter of the disk), the air bearing that supports the head 6 eventually dissipates until the head 6 contacts the disk 4 as the disk 4 spins to a stop. In order to minimize head wear, it is important to stop the disk 4 as soon as possible after the head 6 contacts the disk 4. Prior art spin-down techniques employ active braking wherein the current driving the spindle motor 16 is reversed while commutating the windings in response to the back EMF threshold crossings 34, thereby applying a braking torque to the spindle motor 16. When the velocity of the spindle motor 16 decreases to a point that the back EMF threshold crossings 34 are no longer reliable, prior art disk drives employ dynamic braking wherein the windings of the spindle motor 16 are simply shorted to brake the spindle motor 16 until the disk 4 stops spinning. However, a significant amount of head wear can still occur while dynamic braking at low RPMs since the braking power decays as the current in the windings decays.

There is, therefore, a need to reduce the spin-down time in a disk drive in order to reduce head wear.

SUMMARY OF THE INVENTION

The present invention may be regarded as a disk drive comprising a disk, a head actuated over the disk, and a spindle motor for rotating the disk, the spindle motor comprising a plurality of windings. Disk control circuitry executes a spin-down operation of the spindle motor by estimating an angular position of the spindle motor by applying a voltage to at least one of the windings and evaluating a rise time of current flowing through the winding. The windings are commutated in response to the estimated angular position, and a driving current is applied to the windings to brake the spindle motor.

In one embodiment, the disk control circuitry estimates an angular velocity of the spindle motor in response to the estimated angular position. In one embodiment, the disk control circuitry shorts the windings in order to brake the spindle motor when the estimated angular velocity falls below a predetermined threshold, and in one embodiment when the estimated angular velocity is substantially zero.

In yet another embodiment, the disk control circuitry periodically estimates the angular position of the spindle motor to determine when to commutate the windings.

In still another embodiment, the disk control circuitry disables the driving current while estimating the angular position of the spindle motor.

The present invention may also be regarded as a method of spinning down a disk drive, the disk drive comprising a disk, a head actuated over the disk, and a spindle motor for rotating the disk, the spindle motor comprising a plurality of windings. An angular position of the spindle motor is estimated by applying a voltage to at least one of the windings and evaluating a rise time of current flowing through the winding. The windings are commutated in response to the estimated angular position, and a driving current is applied to the windings to brake the spindle motor.

DESCRIPTION OF THE PREFERRED EMBODIMENTS

Figure 2A:
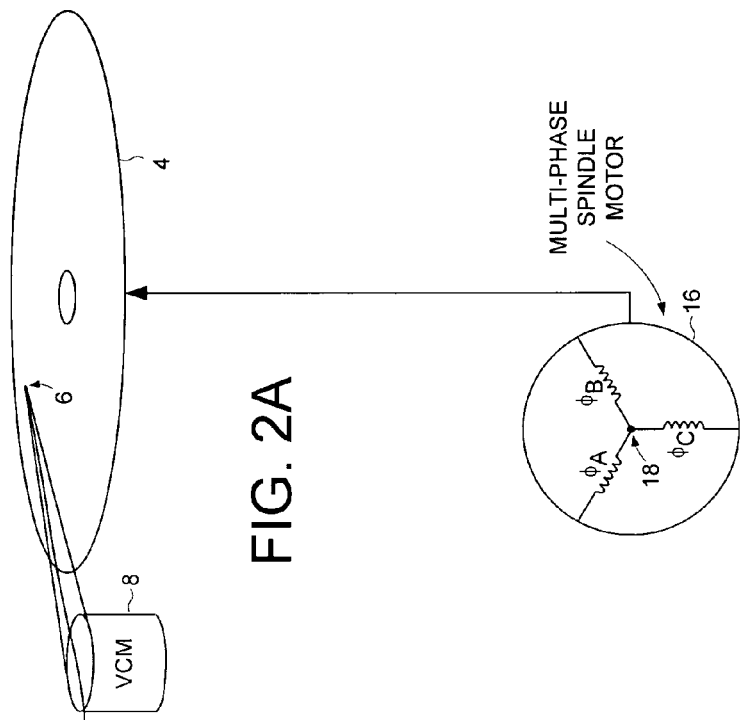
FIG. 2A shows a disk drive according to an embodiment of the present invention comprising disk control circuitry for executing a spin-down operation of the spindle motor.
Figure 2B:
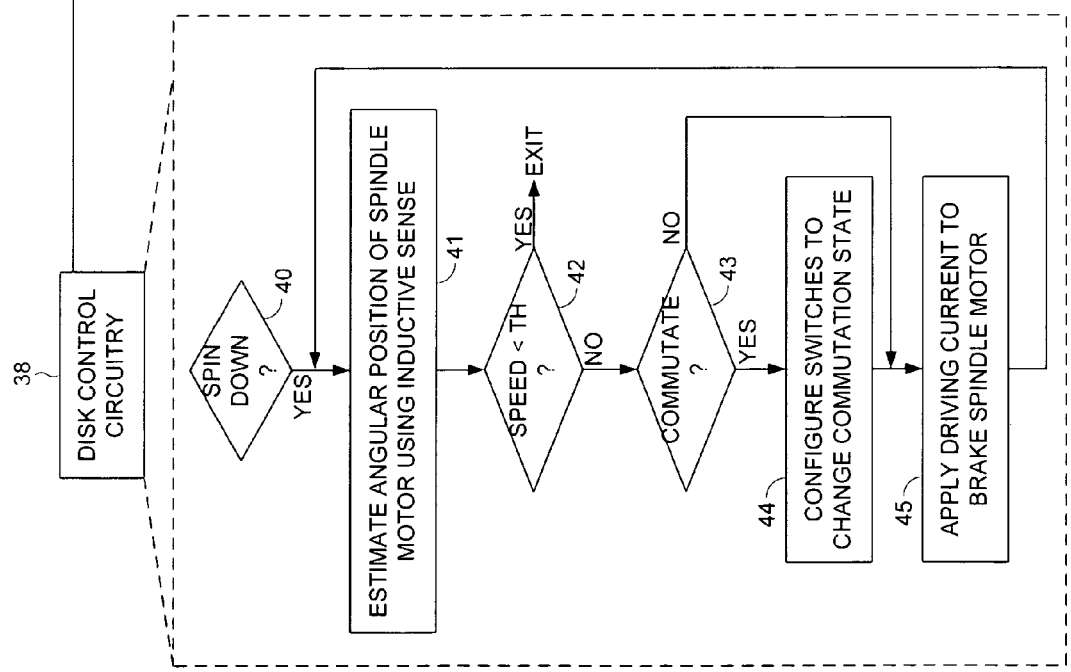
FIG. 2B is a flow diagram executed by the disk control circuitry of FIG. 2A for executing the spin-down operation by estimating an angular position of the spindle motor using inductive sense.

FIG. 2A shows a disk drive according to an embodiment of the present invention comprising a disk 4, a head 6 actuated over the disk 4, and a spindle motor 16 for rotating the disk 4, wherein the spindle motor 16 comprising a plurality of windings. The disk drive further comprises disk control circuitry 38 for executing a spin-down operation of the spindle motor 16 as shown in the flow diagram of FIG. 2B. If at step 40 a spin-down operation is initiated, at step 41 an angular position of the spindle motor 16 is estimated by applying a voltage to at least one of the windings and evaluating a rise time of current flowing through the winding. If at step 42 an estimated speed of the spindle motor 16 has not fallen to a predetermined threshold (e.g., substantially zero), and at step 43 the estimated angular position indicates the windings should be commutated, at step 44 the windings are commutated. At step 45 a driving current is applied to the windings to brake the spindle motor.

Any suitable number of windings may be employed in the spindle motor 16. In the embodiment of FIG. 2A, the spindle motor 16 comprises three coils φA, φB, and φC one of which represents a winding or two connected in series represents a winding. In addition, any suitable commutation technique may be employed to commutate the windings of the spindle motor. Still further, the rise times of the current in the windings of the spindle motor 16 may be evaluated using any suitable technique, such measuring the time required for the current to reach a predetermined threshold, or measuring a magnitude of the current after a fixed time period.

Figure 3:
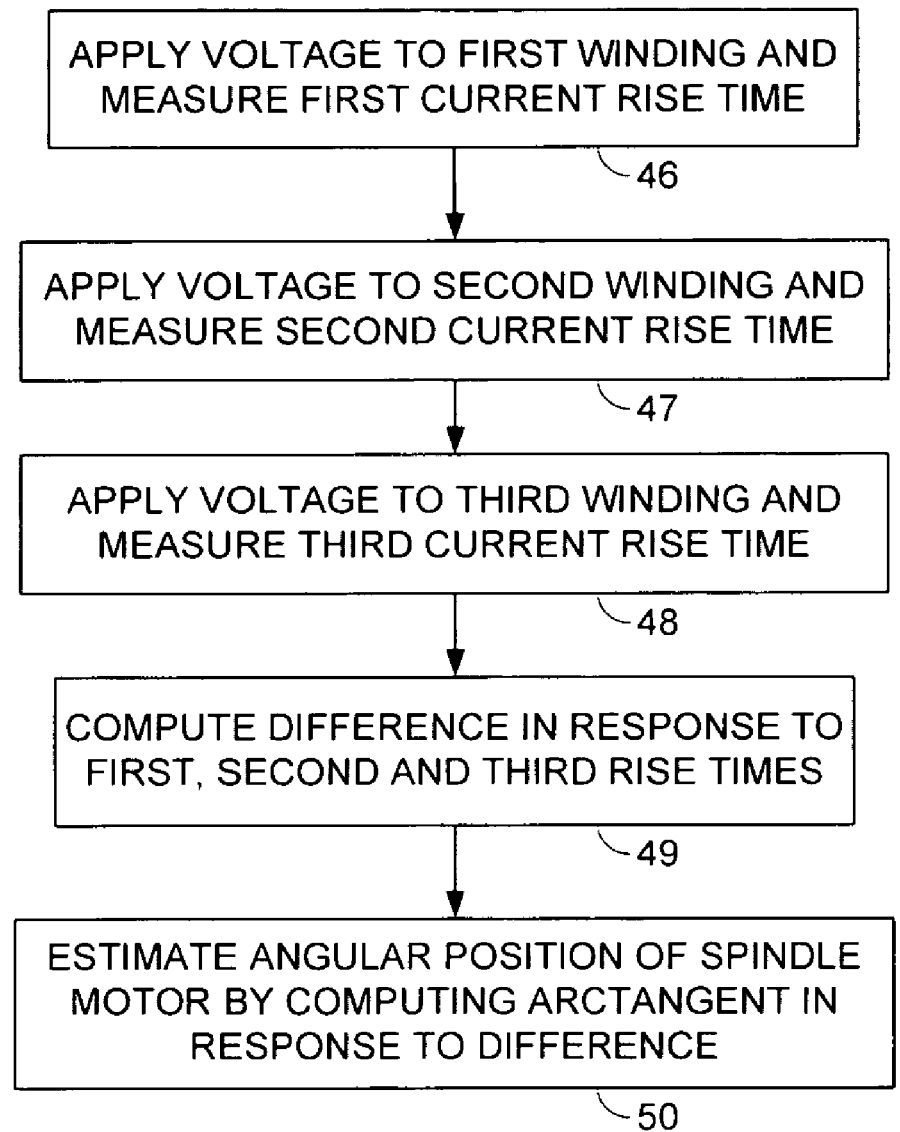
FIG. 3 is a flow diagram according to an embodiment of the present invention for estimating the angular position of the spindle motor, including to measure at least a first and second rise time of current in first and second windings, computing a difference between the rise times, and computing an arctangent in response to the difference.

FIG. 3 is a flow diagram according to an embodiment of the present invention for estimating the angular position of the spindle motor, wherein at step 46 a voltage is applied to a first winding and a first rise time is measured for current flowing through the first winding to reach a predetermined threshold. At step 47 a voltage is applied to a second winding and a second rise time is measured for current flowing through the second winding to reach a predetermined threshold. At step 48 a voltage is applied to a third winding and a third rise time is measured for current flowing through the third winding to reach a predetermined threshold. At step 49 a difference is computed in response to the first rise time, the second rise time, and the third rise time, and at step 50 an angular position of the spindle motor is estimated by computing an arctangent in response to the difference.

Figure 4A:
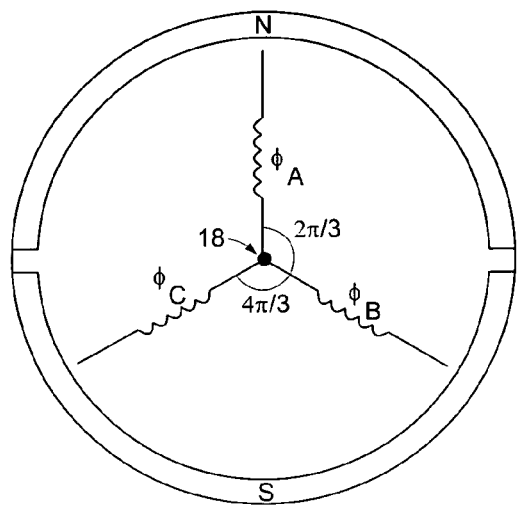
FIG. 4A illustrates a two pole, three phase spindle motor comprising an A coil a B coil and a C coil.

FIG. 4A shows an example spindle motor comprising three phases or coils φA, φB, and φC and two magnets or poles, although any suitable number of coils and poles may be employed. A typical spindle motor employed in a disk drive comprises three phases and eight poles. In the embodiments of the present invention, the angular position of the spindle motor is estimated in electrical degrees, and therefore the following derivations apply to any number of poles.

The inductance of each coil changes relative to its angular position with respect to the poles due to the magnetic fields emanating from the poles, and therefore when a voltage is applied to a coil the rise time of current flowing through the coil changes with angular position. Ignoring the coil resistance, the current flowing through a coil is expressed as:

$$I = \frac{1}{L + \Delta L} \int_0^t V \, dt = \frac{Vt}{L + \Delta L} \quad (1)$$

where I is the current flowing through the coil, L is the original inductance of the coil, and $\Delta L$ is the change in inductance due to the magnetic fields of the poles. Eq. (1) can be expressed for each coil as:

$$I_{TH} = \frac{Vt_A}{L_A + \Delta L_A} = \frac{Vt_B}{L_B + \Delta L_B} = \frac{Vt_C}{L_C + \Delta L_C} \quad (2)$$

where $I_{TH}$ is a predetermined threshold current.

Figure 4B:
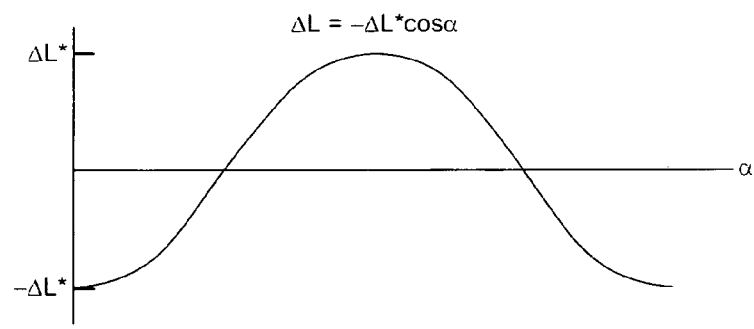
FIG. 4B is a waveform illustrating the changing inductance in a coil relative to the angular position of the coil.

FIG. 4B shows that the change in inductance can be represented as a cosine function:

$$\Delta L = -\Delta L^* \cos \alpha \quad (3)$$

where $\Delta L^*$ is the maximum change in inductance for each coil (assuming equally matched coils) and the angle $\alpha$ is the angular displacement from the north pole (in FIG. 4A, $\alpha$ is zero for coil φA, $2\pi/3$ for coil φB, and $4\pi/3$ for coil φC). Rewriting Eq. (2) using Eq. (3) leads to:

$$I = \frac{Vt_A}{L - \Delta L^* \cos\alpha} = \frac{Vt_B}{L - \Delta L^* \cos\left(\alpha + \frac{2\pi}{3}\right)} = \frac{Vt_C}{L - \Delta L^* \cos\left(\alpha + \frac{4\pi}{3}\right)} \quad (4)$$

From Eq. (4):

$$\frac{t_A}{\frac{L}{\Delta L^*} - \cos\alpha} = \frac{t_B}{\frac{L}{\Delta L^*} - \cos\left(\alpha + \frac{2\pi}{3}\right)} \quad (5)$$

Eq. (5) transforms to:

$$\frac{L}{\Delta L^*} t_A - t_A \cos\left(\alpha + \frac{2\pi}{3}\right) = \frac{L}{\Delta L^*} t_B - t_B \cos\alpha \quad (6)$$

Eq. (6) transforms to:

$$\frac{L}{\Delta L^*} = \frac{t_A \cos\left(\alpha + \frac{2\pi}{3}\right) - t_B \cos\alpha}{t_A - t_B} \quad (7)$$

Also from Eq. (4):

$$\frac{t_A}{\frac{L}{\Delta L^*} - \cos\alpha} = \frac{t_C}{\frac{L}{\Delta L^*} - \cos\left(\alpha + \frac{4\pi}{3}\right)} \quad (8)$$

Eq. (8) transforms to:

$$\frac{L}{\Delta L^*} = \frac{t_A \cos\left(\alpha + \frac{4\pi}{3}\right) - t_C \cos\alpha}{t_A - t_C} \quad (9)$$

From Eq. (7) and (9):

$$\frac{t_A \cos\left(\alpha + \frac{2\pi}{3}\right) - t_B \cos\alpha}{t_A - t_B} = \frac{t_A \cos\left(\alpha + \frac{4\pi}{3}\right) - t_C \cos\alpha}{t_A - t_C} \quad (10)$$

$$t_A(t_A - t_C)\cos\left(\alpha + \frac{2\pi}{3}\right) - t_B(t_A - t_C)\cos\alpha =$$
$$t_A(t_A - t_B)\cos\left(\alpha - \frac{4\pi}{3}\right) - t_C(t_A - t_B)\cos\alpha$$

$$t_A(t_A - t_C)\cos\left(\alpha + \frac{2\pi}{3}\right) - t_A(t_A - t_B)\cos\left(\alpha - \frac{4\pi}{3}\right) =$$
$$t_B(t_A - t_C)\cos\alpha - t_C(t_A - t_B)\cos\alpha$$

$$t_A(t_A - t_C)\cos\left(\alpha + \frac{2\pi}{3}\right) - t_A(t_A - t_B)\cos\left(\alpha - \frac{4\pi}{3}\right) =$$
$$(t_A t_B - t_B t_C - t_A t_C + t_B t_C)\cos\alpha = t_A(t_B - t_C)\cos\alpha$$

$$(t_A - t_C)\cos\left(\alpha + \frac{2\pi}{3}\right) - (t_A - t_B)\cos\left(\alpha + \frac{4\pi}{3}\right) = (t_B - t_C)\cos\alpha$$

Defining $\Delta t_1 = t_A - t_C$, $\Delta t_2 = t_A - t_B$ and $\Delta t_3 = t_B - t_C$, then Eq. (10) reduces to:

$$\Delta t_1 \cos\left(\alpha + \frac{2\pi}{3}\right) - \Delta t_2 \cos\left(\alpha + \frac{4\pi}{3}\right) = \Delta t_3 \cos\alpha \quad (11)$$

Expand the cosine and sine terms $$\Delta t_1 \left(\cos\alpha \cos\frac{2\pi}{3} - \sin\alpha \sin\frac{2\pi}{3}\right) - \Delta t_2 \left(\cos\alpha \cos\frac{4\pi}{3} - \cos\alpha \cos\frac{2\pi}{3}\right) = \Delta t_3 \cos\alpha.$$

Substituting $\cos\frac{2\pi}{3} = \cos\frac{4\pi}{3} = -0.5$ and $\sin\frac{2\pi}{3} = -\sin\frac{4\pi}{3} = 0.866$ leads to:

$$\Delta t_1 \cos\frac{2\pi}{3}\cos\alpha - \Delta t_1 \sin\frac{2\pi}{3}\sin\alpha - \Delta t_2 \cos\frac{2\pi}{3}\cos\alpha - \Delta t_2 \sin\frac{2\pi}{3} = \quad (12)$$
$$\Delta t_3 \cos\alpha \left(\Delta t_1 \cos\frac{2\pi}{3} - \Delta t_3 - \Delta t_2 \cos\frac{2\pi}{3}\right)\cos\alpha = (\Delta t_1 + \Delta t_2)\sin\frac{2\pi}{3}\sin\alpha$$

$$\tan\alpha = \frac{\Delta t_1 \cos\frac{2\pi}{3} - \Delta t_3 - \Delta t_2 \cos\frac{2\pi}{3}}{(\Delta t_1 + \Delta t_2)\sin\frac{2\pi}{3}}$$

or $$\alpha = \arctan\frac{\Delta t_2 - \Delta t_1 - 2\Delta t_3}{1.732(\Delta t_1 + \Delta t_2)}$$

Figure 4C:
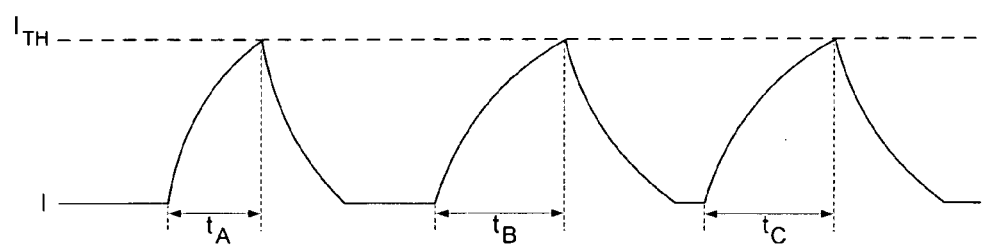
FIG. 4C illustrates the rise times of the current flowing through the three coils when a constant voltage is applied to each coil.

Therefore the angle α representing the angular displacement of the coil φA from the north pole (electrical degrees) can be determined by computing a difference between the current rise times in each coil $t_A$, $t_B$, $t_C$, and computing an arctangent in response to the difference. FIG. 4C illustrates the current rise times for each coil which is measured as the time it takes the current to reach a predetermined threshold TH after applying a voltage across each coil. A predetermined delay is required between each rise time measurement to allow the current in the previously measured coil to decay as shown in FIG. 4C.

Figure 5:
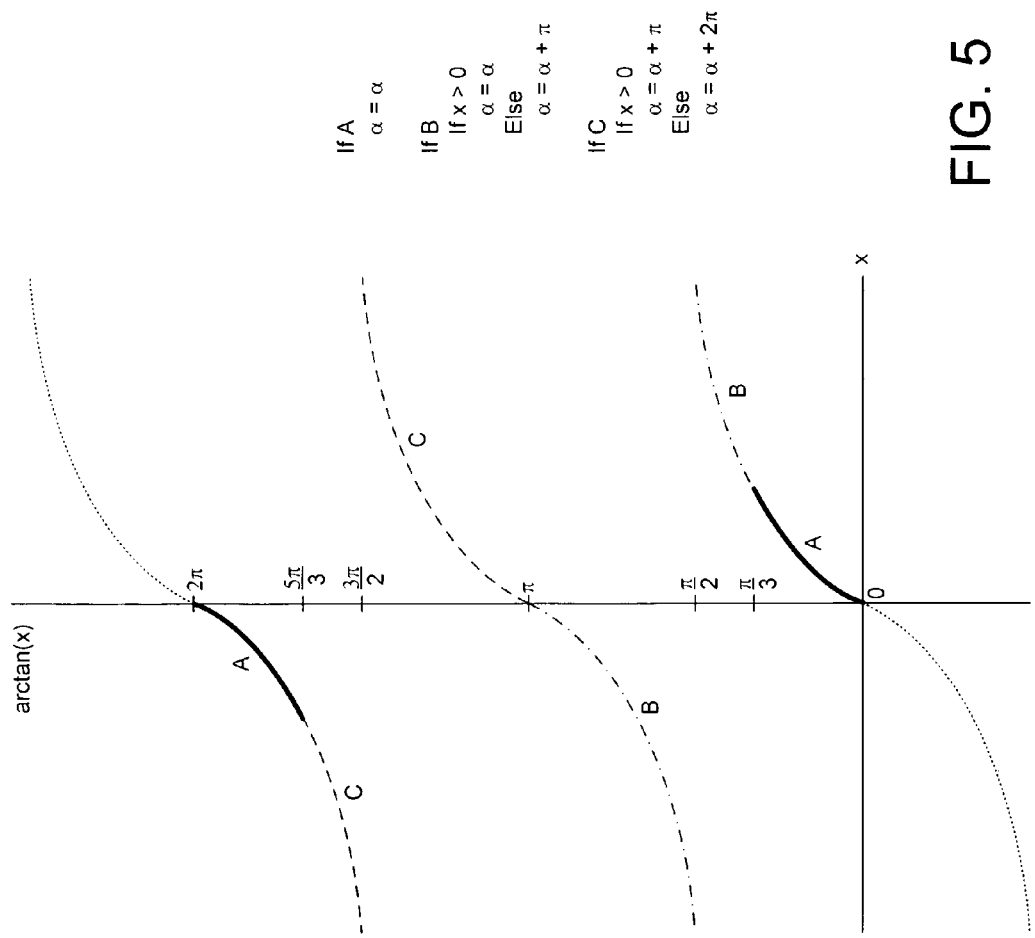
FIG. 5 illustrates how in one embodiment the ambiguity in the arctangent computation is resolved into a particular quadrant by comparing the current rise times for each of the three coils.

Since the arctangent function does not have a unique value over an entire electrical cycle (0–2π), in one embodiment the rise times for each coil are compared to determine a quadrant for the estimated angular position. The coil having the shortest rise time is the coil aligned closest to the north pole. Therefore, the quadrant for the estimated angular position can be determined from the shortest rise time as illustrated in FIG. 5. If $t_A$ is the shortest rise time, then α must be in the range 0 to π/3 and 5π/3 to 2π (equivalent to −π/3 to π/3) and no adjustment is made to α. If $t_B$ is the shortest rise time, then α must be in the range π/3 to π and therefore π is added to α if the argument of the arctangent is negative. If $t_C$ is the shortest rise time, then α must be in the range π to 5π/3 and therefore π is added to α if the argument of the arctangent is positive and 2π is added to α if the argument to the arctangent is negative.

Figure 6:
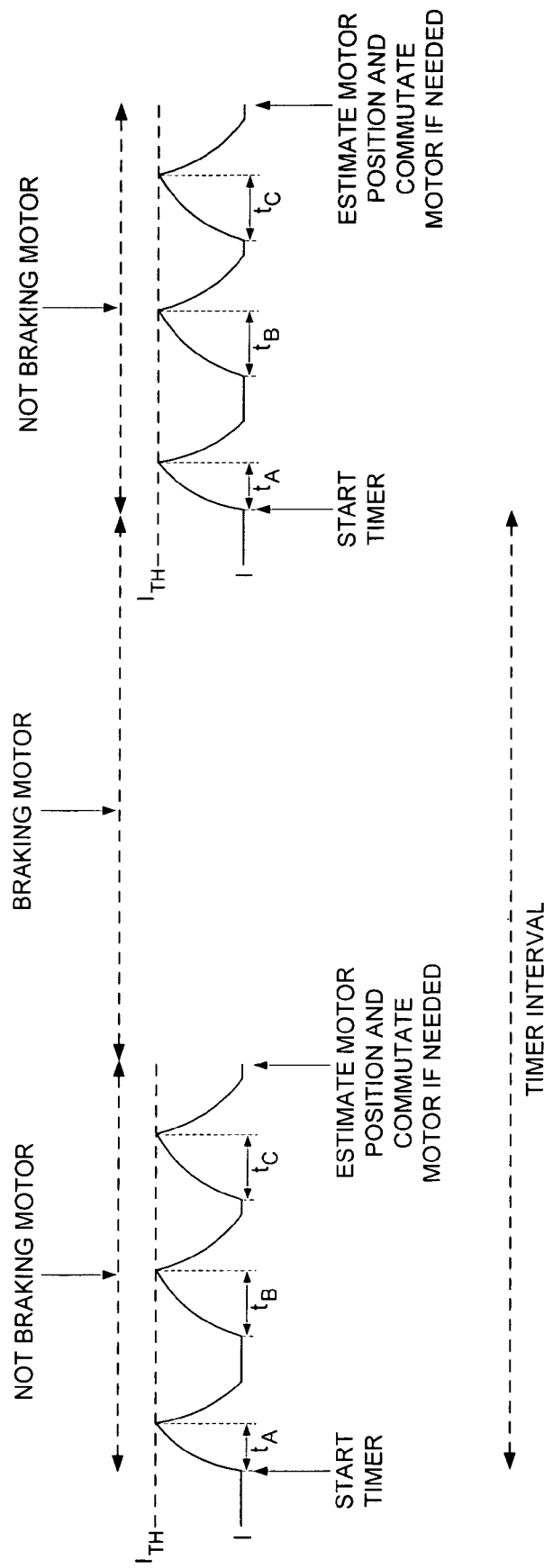
FIG. 6 illustrates an embodiment of the present invention wherein the angular velocity of the spindle motor is estimated by sensing the position of the coils at a predetermined interval.

In one embodiment, the disk control circuitry 38 implements a closed loop servo system for controlling the spindle motor 16 using the estimated angular position as feedback during the spin-down operation. When the spindle motor 16 reaches a predetermined angular velocity, the disk control circuitry 38 switches to dynamic braking (shorting the windings) to brake the spindle motor 16. FIG. 6 illustrates an embodiment of the present invention wherein the angular velocity of the spindle motor 16 is estimated by sensing the position of the coils at a predetermined interval. The predetermined interval is measured by a timer, wherein the angular position of the spindle motor 16 is estimated when the timer expires. While the disk control circuitry 38 is measuring the rise times for each winding, the braking current is not being applied to the spindle motor 16. That is, the braking current is applied to the spindle motor 16 only during the interval between each estimate of the angular position as shown in FIG. 6. After estimating the angular position, the spindle motor 16 is commutated to the next state if necessary (i.e., if the estimated angular position indicates the commutation state should be changed). The predetermined interval for estimating the angular position should be short enough so that there is sufficient resolution to commutate the spindle motor 16 at the appropriate time.

Figure 1:
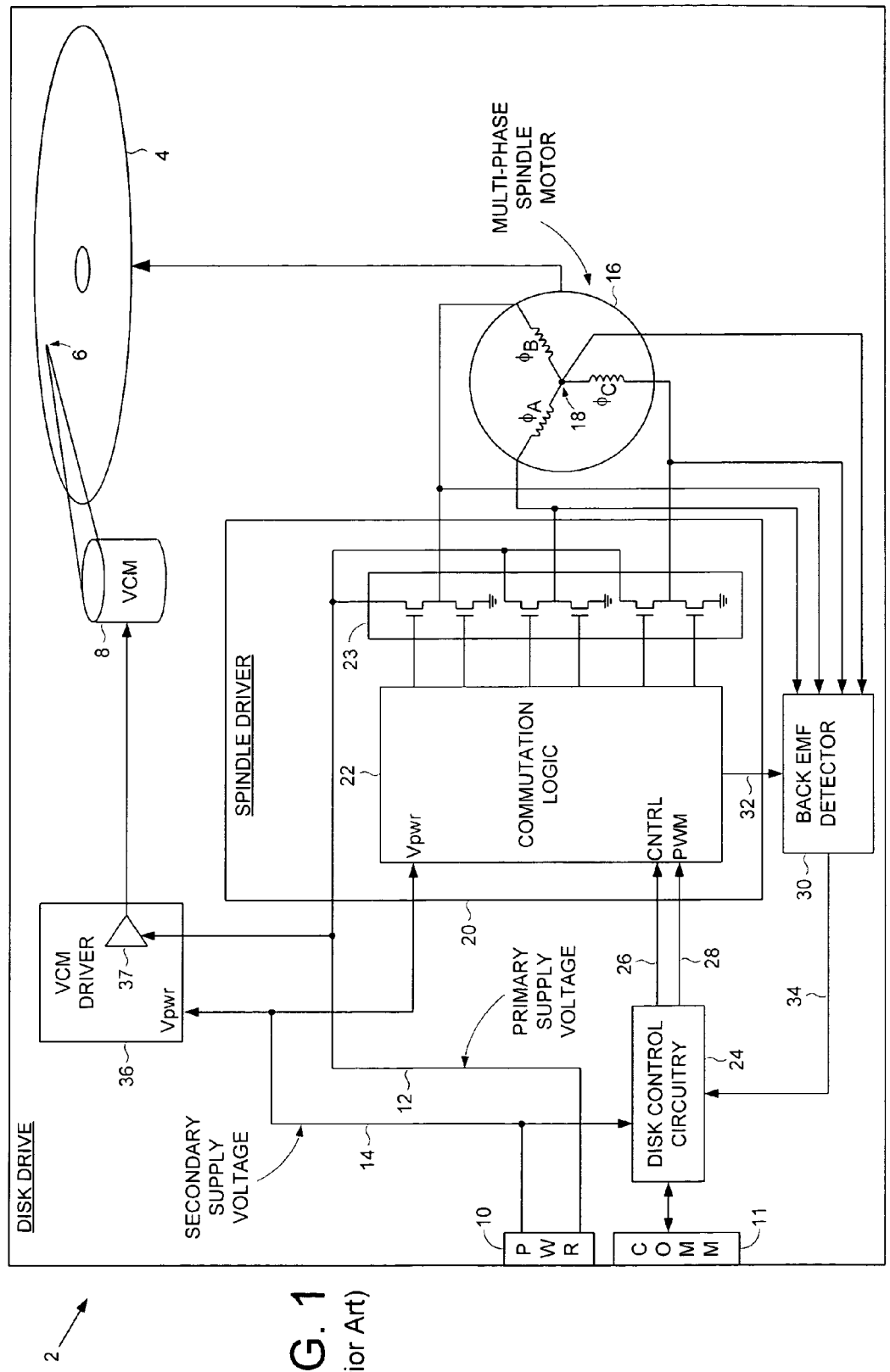
FIG. 1 shows a prior art disk drive comprising a spindle motor and commutation logic for commutating the spindle motor in response to a back EMF voltage generated by the spindle motor.
Figure 7:
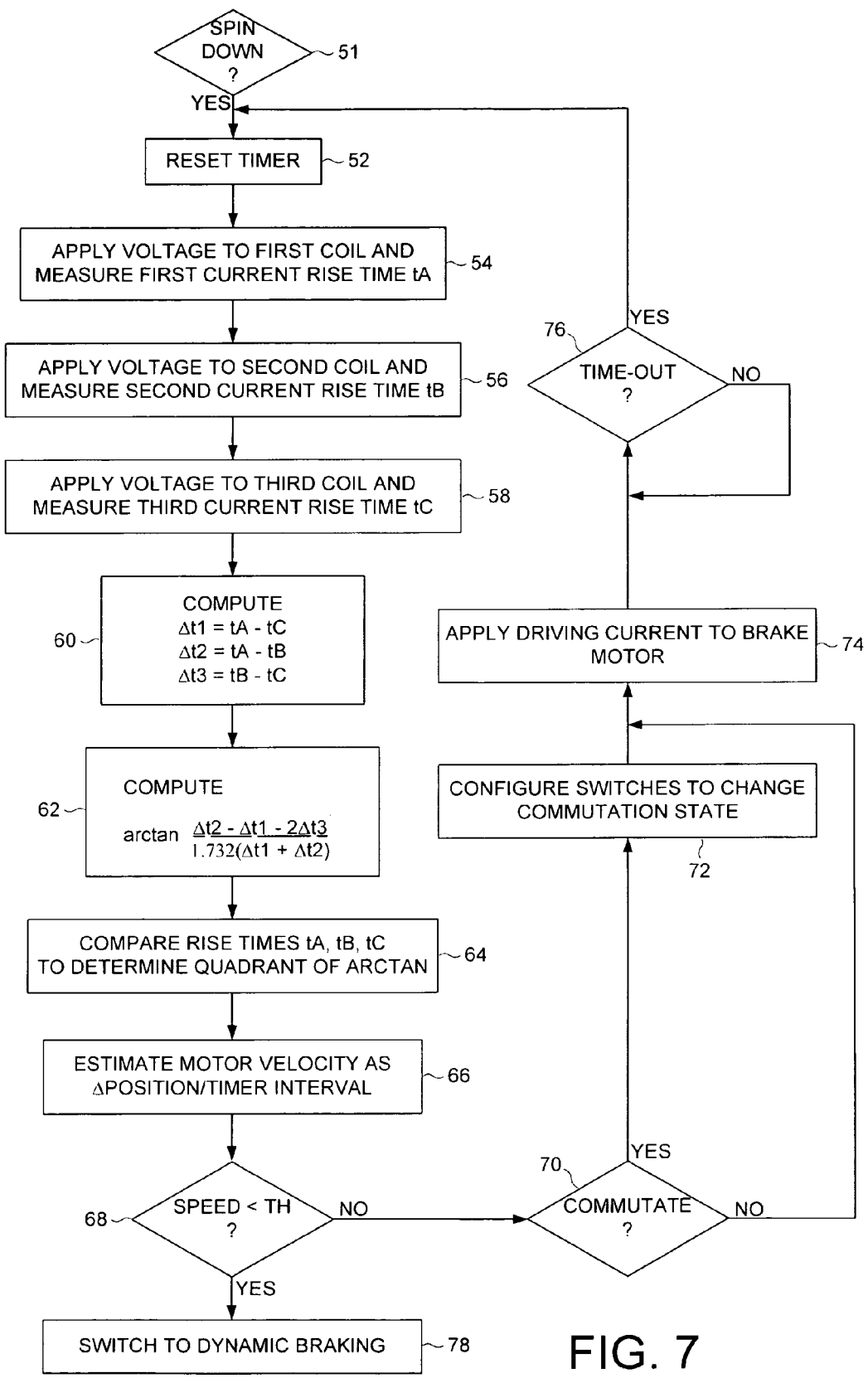
FIG. 7 is a flow diagram according to an embodiment of the present invention for estimating the angular position of a three phase spindle motor at a predetermined interval, and switching to dynamic braking when the estimated velocity falls below a predetermined threshold.

FIG. 7 is a flow diagram according to an embodiment of the present invention for estimating the angular position of a three phase spindle motor at a predetermined interval, and switching to dynamic braking (shorting the windings) when the estimated velocity falls below a predetermined threshold. If at step 51 a spin-down operation is initiated, at step 52 a timer is reset wherein the timer for timing the interval for estimating the angular position of the spindle motor 16. At step 54 a voltage is applied to the first coil φA and the rise time $t_A$ for the current to reach a predetermined threshold is measured. At step 56 a voltage is applied to the second coil φB and the rise time $t_B$ for the current to reach a predetermined threshold is measured. At step 58 a voltage is applied to the third coil φC and the rise time $t_C$ for the current to reach a predetermined threshold is measured. The rise times may be measured using any suitable technique, such as a current sensor in series with the coil. Any suitable voltage may be applied to the coils, and in one embodiment the primary supply voltage 12 (FIG. 1) is applied to each coil by appropriately configuring switches 23 and grounding the center tap 18.

Referring again to FIG. 7, at step 60 the disk control circuitry 38 computes $\Delta t_1 = t_A - t_C$, $\Delta t_2 = t_A - t_B$ and $\Delta t_3 = t_B - t_C$, and at step 62 computes the arctangent of Eq. 12 to estimate the angular position. At step 64 the disk control circuitry 38 compares the rise times $t_A$, $t_B$, $t_C$ to determine a quadrant for the estimated angular position as described above with reference to FIG. 5. At step 66 the disk control circuitry 38 estimates the spindle motor velocity by computing the difference between consecutive estimated angular positions divided by the time interval between estimates. If at step 68 the estimated velocity of the spindle motor 16 has not fallen to a "switch over" velocity, at step 70 the estimated angular position is evaluated to determine whether the spindle motor 16 should switch commutation states. If commutation is needed, at step 72 the switches 23 (FIG. 1) are configured to change the commutation state. At step 74 a driving current is applied to the spindle motor (e.g., by applying the primary supply voltage 12 to the windings pulse width modulated) to drive the spindle motor 16 in a reverse direction. The disk control circuitry 38 then waits at step 76 until the timer expires wherein the flow diagram is repeated starting at step 52. If at step 68 the estimated velocity of the spindle motor 16 has fallen to the "switch over" velocity, then at step 78 the disk control circuitry 38 switches to dynamic braking (shorting the windings). In one embodiment, the control circuitry 38 switches to dynamic braking when the estimated velocity of the spindle motor 16 reaches substantially zero.

Figure 8:
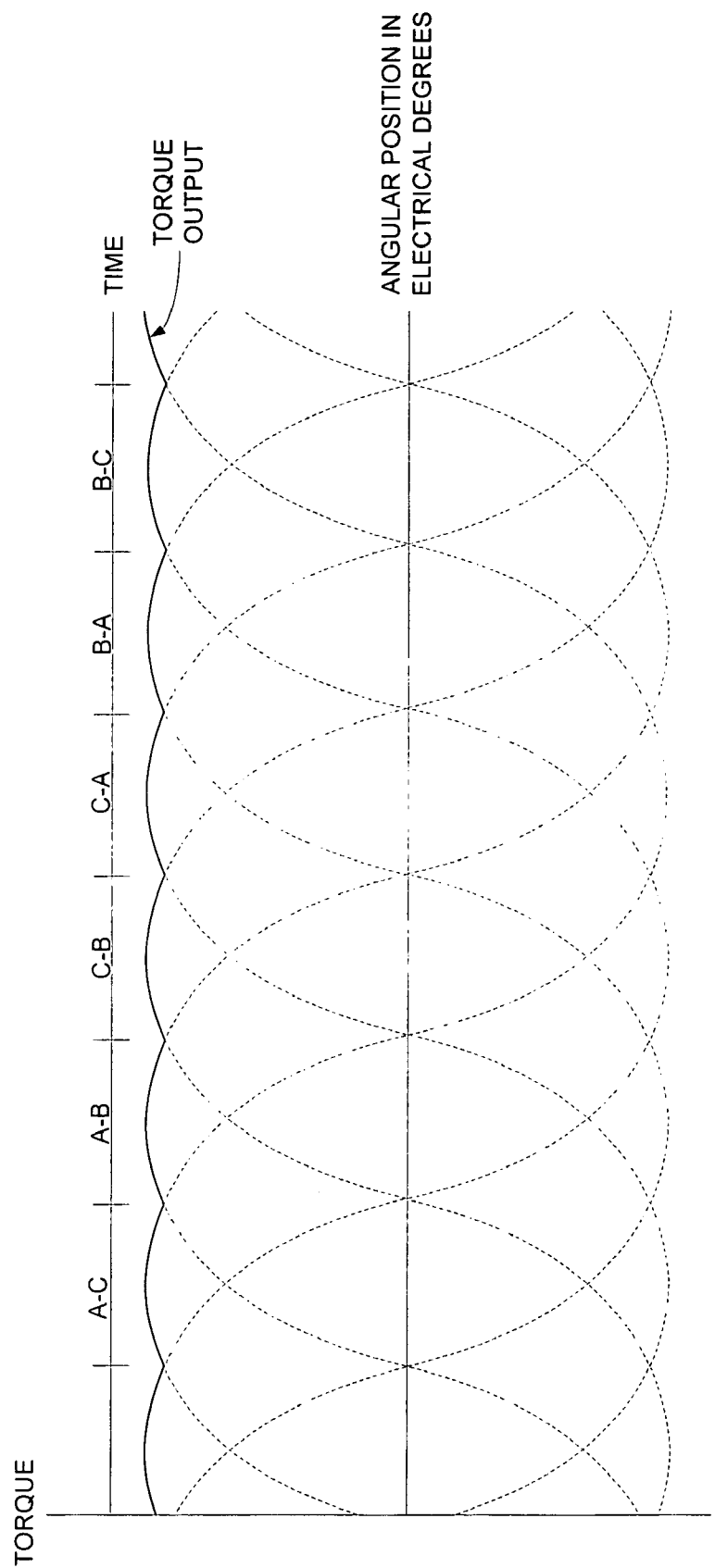
FIG. 8 shows the torque curves corresponding to six commutation states of an eight pole, three phase spindle motor.

In one embodiment, the spindle motor 16 is commutated over six commutation states wherein during each commutation state two of the three coils are connected in series and energized by applying the primary voltage 12. FIG. 8 shows the torque curves (dashed lines) corresponding to the six commutation states A-C, A-B, C-B, C-A, B-A and B-C. If the commutation states are switched at the appropriate time relative to the angular position of the spindle motor 16, the torque applied to the spindle motor (solid line) is maximized. Applying a voltage to the active winding that is higher than the back EMF voltage will actively drive the spindle motor forward, whereas applying a voltage less than the back EMF voltage will actively brake the spindle motor 16.

Figure 9:
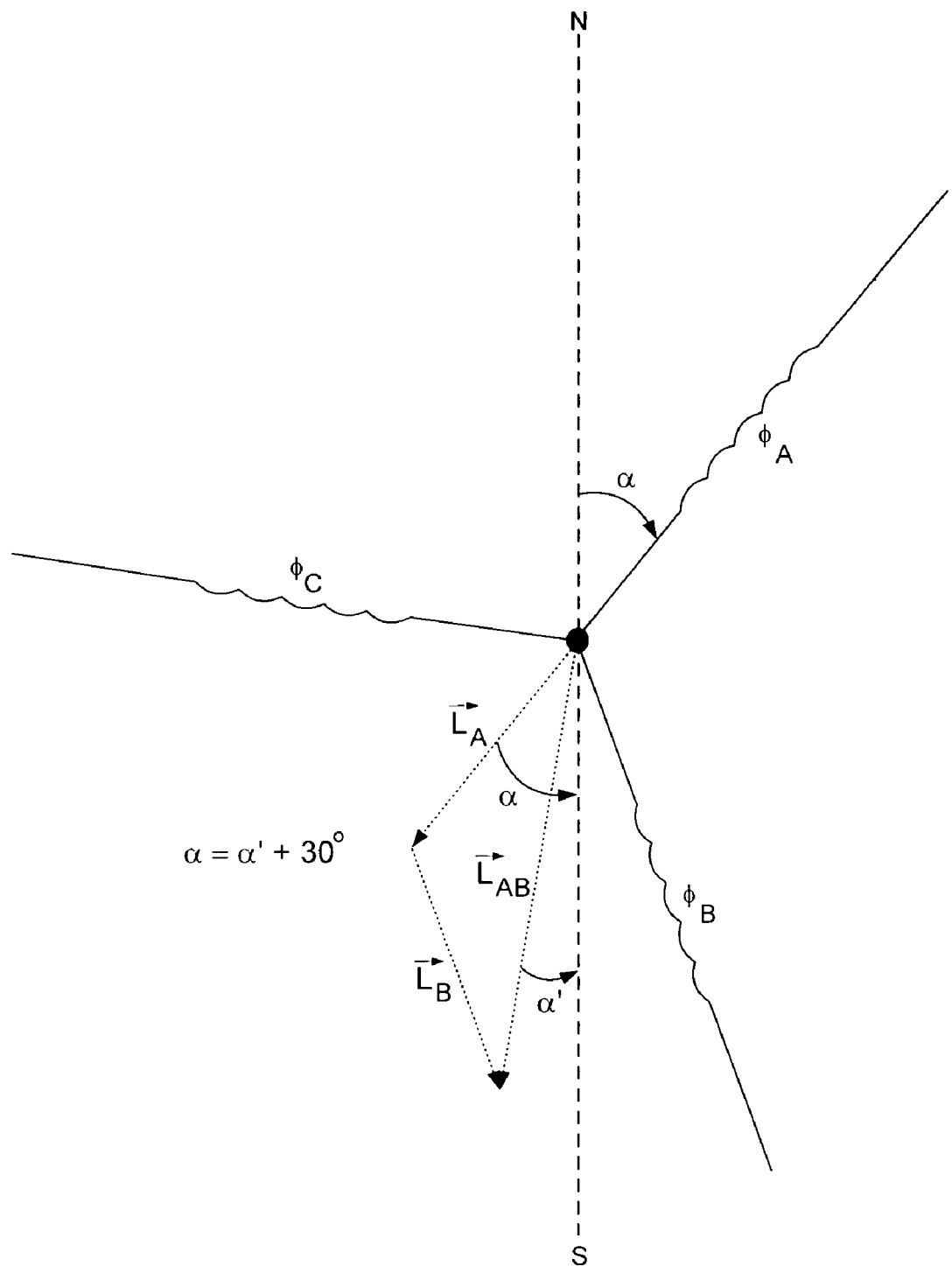
FIG. 9 illustrates an embodiment of the present invention for estimating the angular position of the spindle motor when the current rise time is measured through two coils connected in series according to a commutation state.

In another embodiment, the angular position of the spindle motor 16 is estimated by sensing the inductance of the coils (φA, φB, φC) connected in series according to three of the commutation states. For example, three rise times $t_{A-B}$, $t_{B-C}$ and $t_{C-A}$ are measured corresponding to the three commutation states A-B, B-C, and C-A. The difference in rise times are then computed as $\Delta t_1 = t_{A-B} - t_{C-A}$, $\Delta t_2 = t_{A-B} - t_{B-C}$ and $\Delta t_3 = t_{B-C} - t_{C-A}$, and the arctangent is computed according to Eq. 12 in response to the difference in rise times. FIG. 9 illustrates how the angular position α' computed from Eq. 12 for two coils φA–φB connected in series relates to the angular position α of the single coil φA. As shown in FIG. 9, the two coils connected in series φA–φB can be considered as a vector of inductance $\vec{L}_{AB}$. The angular position α' computed from Eq. 12 corresponds to the vector $\vec{L}_{AB}$, and the angular position α for the single coil φA is computed by adding 30° to α'.

The embodiments of the present invention can be extended to a spindle motor 16 comprising any suitable number of phases (coils). In addition, for spindle motors comprising more than three phases the angular position can be estimated by measuring the rise time for only three windings (three individual coils or coils connected in series according to a commutation state). For example, if the spindle motor 16 comprises four phases (four coils φA, φB, φC, φD), Eq. 4 changes to:

$$I_{TH} = \frac{Vt_A}{L - \Delta L^* \cos\alpha} = \frac{Vt_B}{L - \Delta L^* \cos\left(\alpha + \frac{\pi}{2}\right)} = \quad (13)$$

$$\frac{Vt_B}{L - \Delta L^* \cos(\alpha + \pi)} = \frac{Vt_D}{L - \Delta L^* \cos\left(\alpha + \frac{3\pi}{2}\right)}$$

Eq. 5 and Eq. 8 change to:

$$\frac{t_A}{\frac{L}{\Delta L^*} - \cos\alpha} = \frac{t_B}{\frac{L}{\Delta L^*} - \cos\left(\alpha + \frac{\pi}{2}\right)}$$

$$\frac{t_A}{\frac{L}{\Delta L^*} - \cos\alpha} = \frac{t_C}{\frac{L}{\Delta L^*} - \cos(\alpha + \pi)}$$

After a derivation similar to the three phase spindle motor above:

$$\Delta t_1 \cos\left(\alpha + \frac{\pi}{2}\right) - \Delta t_2 \cos(\alpha + \pi) = \Delta t_3 \cos\alpha - \Delta t_1 \sin\alpha + \Delta t_2 \cos\alpha = \Delta t_3 \cos\alpha$$

Eq. 12 changes to:

$$\alpha = \arctan\frac{\Delta t_2 - \Delta t_3}{\Delta t_1} \quad (14)$$

Comparing Eq. 14 to Eq. 12 the number of computations is actually reduced for a four phase spindle motor. The angular position for two of the four coils connected in series according to a commutation state is estimated by considering the resulting inductance as a vector similar to the three phase embodiment disclosed above with reference to FIG. 9.

In another embodiment of the present invention, at the beginning of the spin-down operation active braking is implemented by estimating the angular position of the spindle motor 16 in response to the back EMF voltage as described above with reference to FIG. 1 When the estimated velocity of the spindle motor 16 falls below a first threshold indicating the back EMF voltage has become unreliable, the disk control circuitry 38 switches to active braking by estimating the angular position of the spindle motor 16 using inductive sense (measuring current rise times in the windings). When the estimated velocity of the spindle motor 16 falls below a second threshold (e.g., reaches substantially zero), the disk control circuitry 38 switches to dynamic braking (shorting the windings).

I claim:

1. A disk drive comprising:
   (a) a disk;
   (b) a head actuated over the disk;
   (c) a spindle motor for rotating the disk, the spindle motor comprising a plurality of windings configurable into a plurality of commutation states; and
   (d) disk control circuitry for executing a spin-down operation of the spindle motor by:
      estimating an angular position of the spindle motor by applying a voltage to at least one of the windings and evaluating a rise time of current flowing through the winding;
      configuring the windings into a selected one of the commutation states in response to the estimated angular position; and
      applying a driving current to the windings of the selected commutation state to brake the spindle motor.

2. The disk drive as recited in claim 1, wherein the disk control circuitry estimates an angular velocity of the spindle motor in response to the estimated angular position.

3. The disk drive as recited in claim 2, wherein the disk control circuitry shorts the windings in order to brake the spindle motor when the estimated angular velocity falls below a predetermined threshold.

4. The disk drive as recited in claim 2, wherein the disk control circuitry shorts the windings in order to brake the spindle motor when the estimated angular velocity is substantially zero.

5. The disk drive as recited in claim 1, wherein the disk control circuitry periodically estimates the angular position of the spindle motor to determine when to change the selected commutation state.

6. The disk drive as recited in claim 1, wherein the disk control circuitry disables the driving current while estimating the angular position of the spindle motor.

7. A method of spinning down a disk drive, the disk drive comprising a disk, a head actuated over the disk, and a spindle motor for rotating the disk, the spindle motor comprising a plurality of windings configurable into a plurality of commutation states, the method comprising:
   (a) estimating an angular position of the spindle motor by applying a voltage to at least one of the windings and evaluating a rise time of current flowing through the winding;
   (b) configuring the windings into a selected one of the commutation states in response to the estimated angular position; and
   (c) applying a driving current to the windings of the selected commutation state to brake the spindle motor.

8. The method as recited in claim 7, further comprising estimating an angular velocity of the spindle motor in response to the estimated angular position.

9. The method as recited in claim 8, further comprising shorting the windings in order to brake the spindle motor when the estimated angular velocity falls below a predetermined threshold.

10. The method as recited in claim 8, further comprising shorting the windings in order to brake the spindle motor when the estimated angular velocity is substantially zero.

11. The method as recited in claim 7, further comprising periodically estimating the angular position of the spindle motor to determine when to change the selected commutation state.

12. The method as recited in claim 7, wherein estimating the angular position of the spindle motor comprises disabling the driving current.

* * * * *